United States Patent [19]
Smith et al.

[11] Patent Number: 5,551,495
[45] Date of Patent: Sep. 3, 1996

[54] UNIVERSAL STAIRCASE HANDRAIL VOLUTE

[75] Inventors: Lynn H. Smith; Mark D. Smith; Dee R. Smith, all of Gunter, Tex.

[73] Assignee: L. J. Smith, Bowerston, Ohio

[21] Appl. No.: 220,836

[22] Filed: Mar. 31, 1994

[51] Int. Cl.$^6$ ................. B27B 1/00; B27D 1/00; B27M 3/00
[52] U.S. Cl. ............... 144/346; 29/428; 29/525; 52/182; 52/187; 156/304.1; 156/304.2; 144/356; 144/365; 144/372; 144/376; 144/367; 144/350; 144/144.1; 144/3.1; 144/1.1; 144/134.1; 144/135.2
[58] Field of Search ............ 52/182, 187; 156/228, 156/304.1, 304.2; 403/6, 10; 364/474.02, 474.09, 474.34; 144/1 R, 3 R, 329, 346, 350, 356, 357, 372, 376, 144 R, 365, 367, 134 R, 134 A

[56] References Cited

U.S. PATENT DOCUMENTS

| | | | |
|---|---|---|---|
| 5,261,201 | 11/1993 | Smith | 52/184 |
| 5,347,774 | 9/1994 | Smith | 144/354 |

*Primary Examiner*—W. Donald Bray
*Attorney, Agent, or Firm*—Harris, Tucker & Hardin, P.C.

[57] ABSTRACT

A method of manufacturing a staircase handrail volute, comprising the steps of: (a) cutting a workpiece from wood with a bandsaw such that the workpiece has an approximation of a shape of the volute, wherein the approximation dimensions are larger than the shape dimensions; (b) mounting the workpiece so that the workpiece may be operated on by a numerically controlled machine tool; (c) cutting a bottom surface of the workpiece to the shape dimensions with the machine tool; (d) cutting lower side surfaces of the workpiece with the machine tool to a first dimension between the approximation dimensions and the shape dimensions; (e) cutting the lower side surfaces of the workpiece with the machine tool to the shape dimensions; (f) drilling at least one mounting hole in the bottom surface with the machine tool, the at least one mounting hole for holding the workpiece in steps (g) through (j); (g) turning the workpiece over and mounting the workpiece so that the workpiece may be operated on by a numerically controlled machine tool; (h) cutting an upper surface of the workpiece with the machine tool to a second dimension between the approximation dimension and the shape dimension; (i) cutting upper side surfaces of the workpiece with the machine tool to the shape dimensions; and (j) cutting the upper surface of the workpiece to the shape dimensions with the machine tool. Other systems, devices and methods are disclosed.

18 Claims, 5 Drawing Sheets

Microfiche Appendix Included
(37 Microfiche, 1 Pages)

UNIVERSAL STAIRCASE HANDRAIL VOLUTE

The computer program listing is contained in the microfiche appendix which constitutes one microfiche of 37 frames.

TECHNICAL FIELD OF THE INVENTION

The present invention relates generally to staircase handrail volutes and more particularly to a universal staircase handrail volute.

BACKGROUND OF THE INVENTION

Curving and spiraling staircases have enjoyed wide popularity throughout the world for centuries. Such staircases have come to be synonymous with wealth, fashion and taste because of their tendency to be used only in residences and commercial buildings conceived on a grand scale. The major reason for confining the use of curving staircases to grand homes has been the cost of building such staircases. Not only do curving staircases require much more floorspace than traditional straight staircases, but their construction entails the use of extremely skilled carpentry artisans. With the exception of the most mundane spiral staircases which are available in "kit" form, all curving staircases are custom built for their intended installation location using painstaking carpentry skills.

Such stairbuilding has never lent itself to the economies of scale of mass production due to the complex nature of the geometries involved, coupled with the fact that the geometric specifications differ from staircase to staircase, depending upon the constraints of the architect's floorplan design. Consequently, intricate details such as the graceful curving volutes which terminate the handrails at the bottom of the staircase are carved by hand individually for each staircase constructed. Such hand carving is very time consuming and therefore quite expensive. Furthermore, there is not always an adequate supply of carpenters having the requisite skill necessary to do such work, therefore many such stairs, even though "handmade," suffer from flaws in the execution of the architect's design.

There is therefore a need in the prior art for a staircase handrail volute that can be mass produced in large numbers and subject to strict quality control standards. Such a volute should be capable of being used with many different curving staircase designs so that maximum advantage can be had with economies of scale in its production. The present invention is directed toward meeting these needs.

SUMMARY OF THE INVENTION

It is therefore the object of the present invention to provide a universal staircase handrail volute that may be manufactured in mass quantities.

It is another object of the present invention to provide a universal staircase handrail volute that may be used with most curved staircase designs.

It is a further object of the present invention to provide a method of manufacturing a universal staircase handrail volute.

Other and further objects of the present invention will become apparent from a reading of the following description taken in conjunction with the appended claims.

In order to meet the forgoing objectives and to overcome the problems inherent in the prior art devices, the present invention provides a universal staircase handrail volute which incorporates a compound curve at its distal end. The compound curve includes an upsweep which transitions through all standard legal staircase pitches. This allows the installer to simply cut the volute at the point in the compound curve that corresponds to the pitch of the staircase being installed. The universal volute will then mate nearly perfectly with the remainder of the staircase handrail, eliminating the need for custom carving of the handrail volute.

In one form of the invention, a method of manufacturing a staircase handrail volute is disclosed, comprising the steps of: (a) cutting a workpiece from wood with a bandsaw such that the workpiece has an approximation of a shape of the volute, wherein the approximation dimensions are larger than the shape dimensions; (b) mounting the workpiece so that the workpiece may be operated on by a numerically controlled machine tool; (c) cutting a bottom surface of the workpiece to the shape dimensions with the machine tool; (d) cutting lower side surfaces of the workpiece with the machine tool to a first dimension between the approximation dimensions and the shape dimensions; (e) cutting the lower side surfaces of the workpiece with the machine tool to the shape dimensions; (f) drilling at least one mounting hole in the bottom surface with the machine tool, the at least one mounting hole for holding the workpiece in steps (g) through (j) ; (g) turning the workpiece over and mounting the workpiece so that the workpiece may be operated on by a numerically controlled machine tool; (h) cutting an upper surface of the workpiece with the machine tool to a second dimension between the approximation dimension and the shape dimension; (i) cutting upper side surfaces of the workpiece with the machine tool to the shape dimensions; and (j) cutting the upper surface of the workpiece to the shape dimensions with the machine tool.

BRIEF DESCRIPTION OF THE DRAWINGS

The novel features believed to be characteristic of the invention are set forth in the appended claims. For a more complete understanding of the present invention, and for further details and advantages thereof, reference is now made to the following Detailed Description taken in conjunction with the accompanying drawings, in which:

It is to be expressly understood, however, that the drawings are for purposes of illustration only and are not intended as a definition of the limits of the invention. Such definition is made only by the appended claims.

DETAILED DESCRIPTION OF THE DRAWINGS

Figure 1:
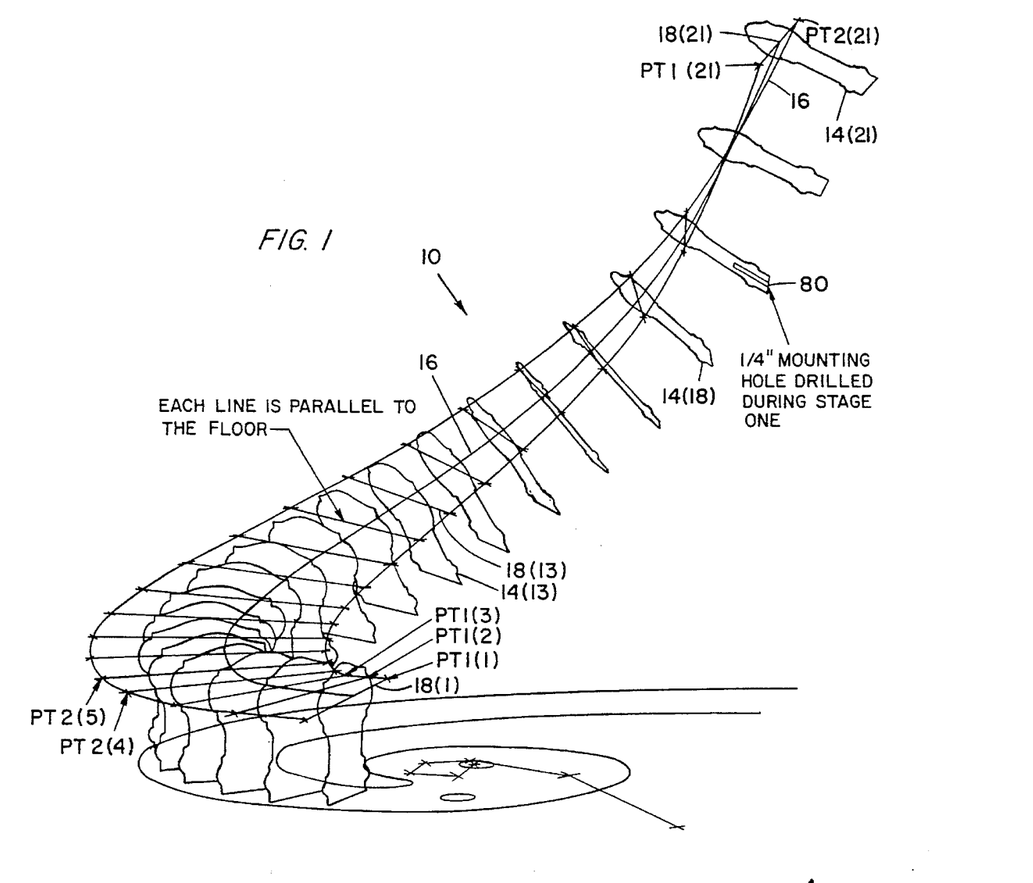
FIG. 1 is an isometric view of a first embodiment apparatus of the present invention.

The present invention relates to universal staircase handrail volutes. FIG. 1 is an isometric view of a first embodiment universal staircase handrail volute according to the present invention, indicated generally at 10. The volute 10 is illustrated in FIG. 1 as a series of cross-sections 14(1) through 14(21) of the actual volute. A plan view projection 12 of the volute 10 in the X-Y plane is shown in FIG. 1, and will be discussed in greater detail hereinbelow with reference to FIG. 2. The volute 10 executes a compound curve, curving in the X-Y plane at the same time that it curves in the Z plane (perpendicular to the X-Y plane). The curve executed by the volute 10 in the X-Y plane is preferably based upon the golden mean. The golden mean is a shape found in many natural objects, such as the curve of the Nautilus shell, and is traditionally preferred as the shape for curved staircase handrail volutes for aesthetic reasons. The curve executed by the volute 10 in the Z plane is described in greater detail hereinbelow with reference to FIG. 3.

Each of the cross-sections 14(n) has a cross-sectional profile which is determined by the aesthetic requirements of the staircase handrail. Even though this cross-sectional shape is infinitely variable, there has emerged over time a "standard" handrail cross-sectional shaped which has been found to be pleasing to the eye as well as pleasing to the touch as the hand is slid along its length. This standard handrail cross-sectional shape is notoriously well known in the art. Because the cross-sectional shape of the volute 10 is determined by the profile of the cutting tool used to form it (as described in greater detail hereinbelow with reference to FIGS. 4–10), the present invention comprehends any cross-sectional shape of the volute 10. Such shape is a mere design choice based upon largely aesthetic considerations.

Each of the cross-sections 14(n) of FIG. 1 is located in the X and Y dimensions such that a projection of the widest point of each cross-section 14(n) will define the plan view projection 12 in the X-Y plane. Furthermore, each of the cross-sections 14(n) is perpendicular to the top and bottom surfaces of the universal volute 10. The height of each cross-section 14(n) in the Z dimension is specified by specifying the height of the imaginary line 16 at its intersection with each of the cross-sections 14(n). The location of the line 16 may be chosen at any location that will intersect each of the cross-sections 14(n). In the preferred embodiment volute 10, the line 16 is located two inches from the bottom surface of the volute 10. Additionally, the line 16 of the preferred embodiment volute 10 is located nearer to the "inside" (smaller radius) of the spiral than to the "outside" (larger radius) of the spiral of the volute 10. Such a location of the line 16 tends to minimize the visible appearance of distortions in the volute 10, as will be discussed in greater detail hereinbelow.

Lines 18(1), 18(2) ... 18(21) are drawn through the points of intersection between the line 16 and each cross-section 14(1), 14(2) ... 14(21), respectively, such lines 18(n) each being parallel to the floor (the X-Y plane). The endpoints of each line 18(n) are defined to be a fixed distance from each edge of the universal volute 10, and are labeled PT1(1) and PT2(1) for line 18(1), PT1(2) and PT2(2) for line 18(2), ... PT1(21) and PT2(21) for line 18(21). It will be appreciated by those skilled in the art, that because the line 16 is not in the center of each cross-section 14(n), and because each pair PT1(n) and PT2(n) is a fixed distance from the edge of the cross-section 14(n), the distance from PT1(n) to the line 16 is not the same as the distance of PT2(n) from the line 16. As will be described in greater detail hereinbelow, the points PT1(n) and PT2(n) correspond to the locations of the cutting tools used to manufacture the universal volute 10, therefore the appropriate distance of each point PT1(n) and PT2(n) from the edge of the cross-sections 14(n) is determined by the requirements of the cutting tool being used.

Because the relationship between each of the cross-sections 14(n) and the line 16 is defined, as is the relationship between the line 16 and the points PT1(n) and PT2(n), it follows that specification of the height in the Z dimension of each point PT1(n) and PT2(n) is adequate to specify the height of each of the corresponding cross-sections 14(n). This height of the cross-sections 14(n) in the Z dimension is discussed in greater detail hereinbelow with reference to FIG. 3.

Figure 2:
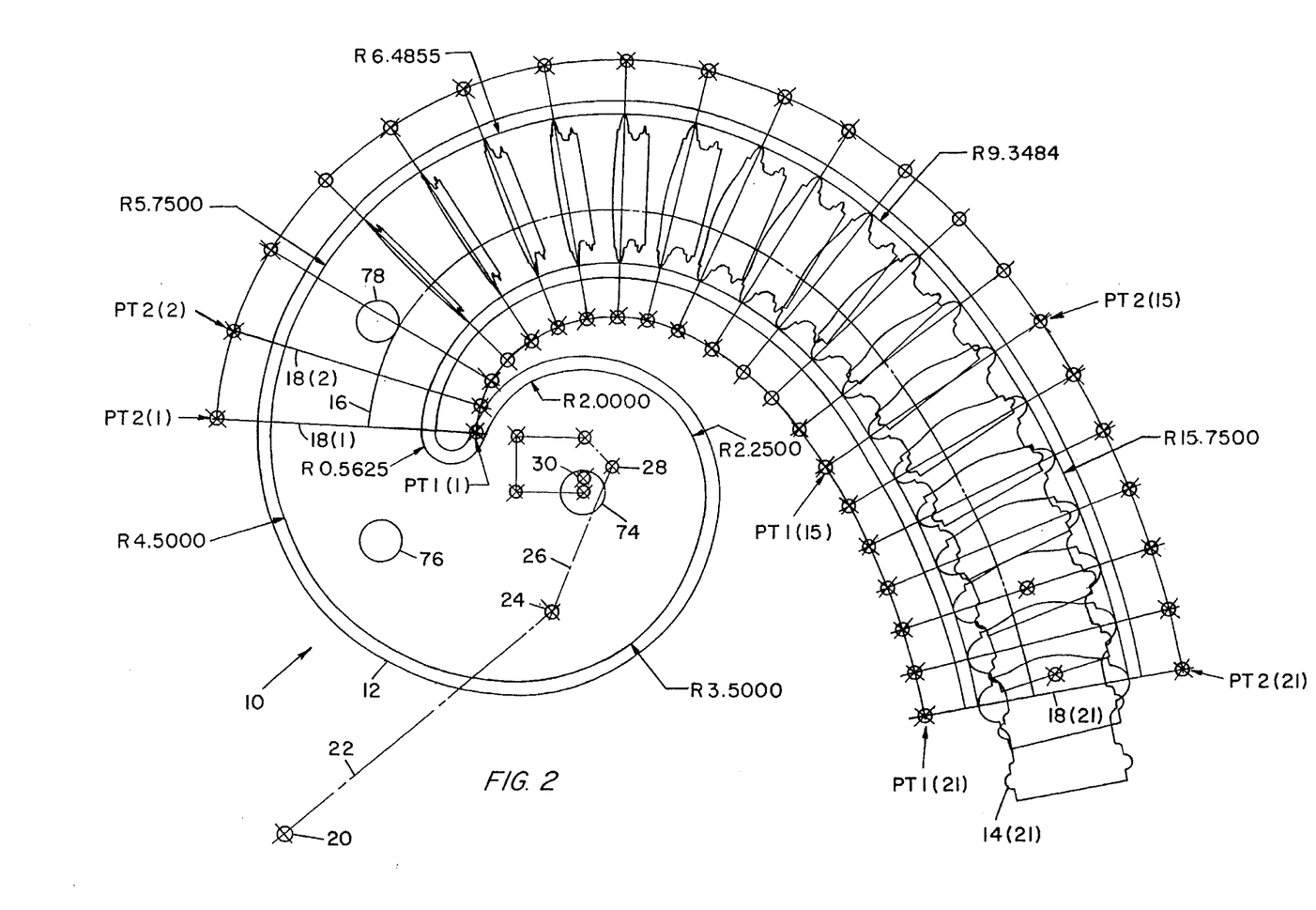
FIG. 2 is a plan view of the first embodiment apparatus of the present invention.

Referring now to FIG. 2, the plan view 12 of the volute 10 is illustrated in the X-Y plane. The curve of the preferred embodiment of the volute 10 in the X and Y directions is defined in FIG. 2 by a series of arc centers based upon the golden mean. For example, arc center 20 defines the center of the radius of curvature of the volute 10 from its distal end at the line defined by the points PT1(21) and PT2(21) to the line defined by points PT1(14) and PT2(14). The radius for these arcs are given (in inches) by the radius pointers in the FIG. 2. At this location the radius drawn from arc center 20 coincides with the line 22 connecting arc center 20 with arc center 24. Arc center 24 then becomes the new arc center and the curve is continued to the left until the radius coincides with the line 26 connecting the next arc center 28. At that point, the arc center 28 is used to continue the plotting of the curve. This process is continued until the final arc center 30 is reached, as is known in the art.

The radius of the volute 10 spiral discontinuously increases as the volute spirals from its centerpoint out to the distal end. At each of these discontinuities of radius, there is a tendency for the volute 10 to have a transitional point between the two radii where the shape of the spiral is not smooth. In an effort to minimize this problem, the line 16 is chosen to be closer to the inside of the spiral of the volute 10 than to the outside. Because the lines 18(n) are set at equal increments along the line 16, moving the line 16 closer to the inside of the spiral causes the points PT2(n) to be spaced further apart for any given increment along the line 16. Because of the nature of the N/C machine tool carving process (described in greater detail hereinbelow), the discontinuities of these radii transitions are minimized be spreading out the spacing of the points PT2(n). The line 16 is therefore chosen to be closer to the inside of the spiral of the volute 10 in the preferred embodiment of the present invention.

Figure 3:
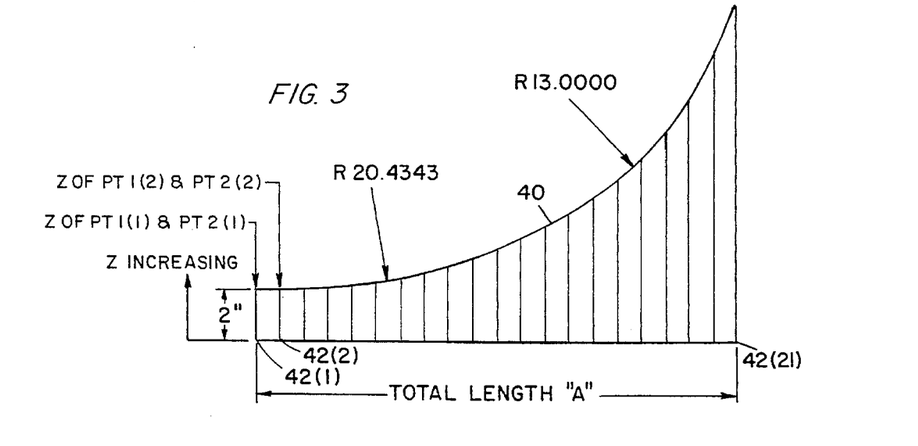
FIG. 3 is a plot of the ramp elevation of the first embodiment apparatus of the present invention.

Referring now to FIG. 3, a plot 40 of the Z dimension elevation of each cross-section 14(n) of the universal volute 10 is given. As can be seen in FIG. 2, each of the lines 18(n) intersect the line 16 at fixed intervals. Because the abscissa of the plot 40 axes of FIG. 3 represents the line 16, it is marked off at fixed intervals 42(1) through 42(21) which correspond to the locations along the line 16 of each of the cross-sections 14(1) through 14(21), respectively, of FIGS. 1 and 2. The plot 40 then gives the Z dimension elevation of the points PT1(n) and PT2(n) for n=1 to 21. Therefore the given elevation for the points PT1(1) and PT2(1) corresponds to 2 inches on the plot 40. As was stated previously with reference to FIG. 1, the line 16 of the preferred embodiment volute 10 is located two inches from the bottom surface of the volute 10. Since the bottom of cross-section 14(1) rests in the X-Y plane, the height of the line 16 at its intersection with the cross-section 14(1 ) is therefore two inches (this point is defined by the lines PT1(1) and PT2(2) as discussed hereinabove).

Plot 40 gives the height of each successive cross-section 14(n). It will be appreciated by those skilled in the art that the exact number of cross-sections 14(n) defined or the exact height of each such cross-section 14(n) is variable. Many external constraints will dictate the appropriate choices, chief among them aesthetic considerations. The present invention therefore comprehends all such arrangements.

The shape of the volute 10 is further defined by lines (not shown for clarity of illustration) drawn through the intersection between lines 18(n) and line 16, but perpendicular to the surface of the volute 10. Each of these further lines is terminated by points PT3(n) and PT4(n) where n=1 to 21 (not shown). Each point PT3(n) and PT4(n) is the same distance from the surface of the volute 10 as are the points PT1(n) and PT2(n). The shape of the volute 10 is further defined by specifying the height of each point PT3(n) and PT4(n) in the Z dimension.

The increase in elevation from one cross-section 14(n) to the next cross-section 14(n+1) defines a pitch of the staircase handrail (and hence the staircase itself) at that point. This pitch is usually measured in this art as the rise over the run. The rise is the height of the stair riser, while the run is the length of the stair tread. The rise/run ratio therefore defines the pitch (or angle of inclination) of the staircase. Most building codes in the United States are based on the Uniform Building Code, which gives a maximum permissible staircase pitch. The minimum pitch standardly used in the United States is generally 25 degrees while the maximum pitch is set by the Building Code at 55 degrees. There is therefore a fixed, limited range of pitch angles which a staircase may standardly and legally have. A novel aspect of the present invention is that the universal volute incorporates all such standard legal pitches within its compound curve. As can be seen from the plot 40 of FIG. 3, the height of the volute 10 in the Z dimension does not increase uniformly as the volute 10 spirals upward. If the increase in the Z dimension were uniform, the plot 40 would be linear, corresponding to a uniform pitch throughout the length of the volute 10. Instead, the plot 40 follows an exponential increase in the Z dimension, corresponding to a continuously changing pitch throughout the length of the volute 10. The range of pitches represented by this curve includes the minimum standard pitch and the maximum legal pitch, as well as all pitches in between.

When the universal volute 10 is being installed on the curved staircase handrail, the user simply determines the pitch of the staircase, locates the section of the volute 10 which corresponds to that pitch, and cuts off the end of the volute 10 at that location, perpendicular to the top of the volute 10. The newly created end of the volute 10 will then match the staircase handrail nearly perfectly because both are at the same pitch. Also, the remainder of the volute 10 provides a pleasing, smooth transition from the selected pitch down the terminal spiral of the volute 10. It will be appreciated by those skilled in the art that a single universal volute 10 of the present invention may easily be applied to any curved staircase handrail that is built within the pitch range allowed by the building code. This represents a substantial improvement over the prior art handcarved volutes which had to be custom made for each separate staircase.

Because the universal volute 10 of the present invention may be used with any standard legal curved staircase, there exists the opportunity to sell the volutes 10 in large quantities. It is therefore desirable to manufacture them using an automated process so that economies of scale may be utilized to produce the volutes 10 both in large quantities and at a reduced cost. The second embodiment of the present invention comprises a method for manufacturing the volutes 10 using a numerically controlled machine tool. As is known in the art, such machine tools are adapted to perform woodworking operations such as drilling, routing and milling under the control of a computer program. The computer program controls the selection of the cutting tool, the exact placement of the part being machined, and the exact placement and motion of the cutting tool as it is worked over the surface of the part.

Figure 4:
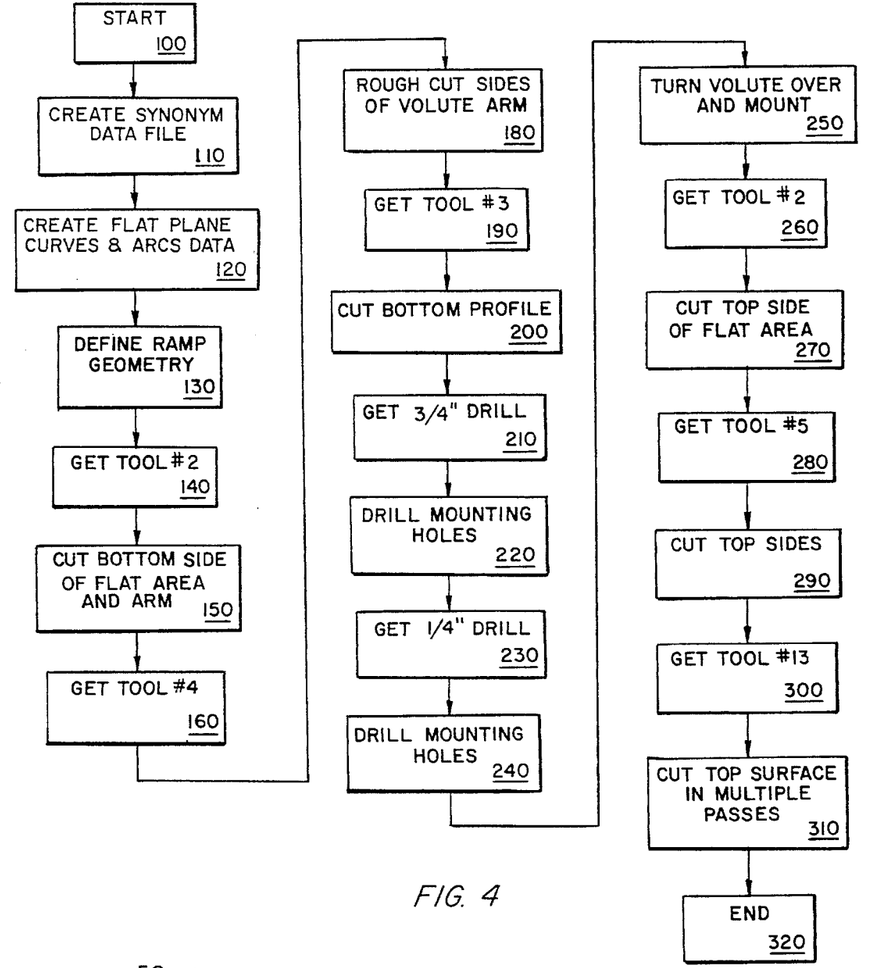
FIG. 4 is a process flow diagram of a second embodiment method of the present invention.

Referring now to FIG. 4, the process flow diagram for cutting and shaping the universal volute 10, which is implemented as a computer software routine controlling a numerically controlled machine tool, will be described. The software in the preferred embodiment is written in the input format required by a Computer Aided Software Engineering (CASE) tool with the trade name of PC-APT™, which is available from N/C Software, Inc., P.O. Box 14, Pataskala, Ohio 43062. The PC-APT™ program takes this input and translates it into instructions which can be read by the machine tool controller.

The process begins at start block 100 and continues at step 110, which creates a synonym data file. This data file contains a translation between the longer, more descriptive command words used by the PC-APT™ CASE tool and shorter, more convenient command codes which are easier for an experienced programmer to use in programming. Next, at step 120, the geometric data for the flat plane curves and arcs is created. This includes defining such parameters as the volute spiral dimensions, the rail cross section dimensions (both rough and finish dimensions), the location of the bolts which hold the piece on the machine tool, the geometry of the individual cutter blades to be used, the arc center points, a series of check points and surfaces. This data will define the shape of the flat section and spiral arm of the volute. Step 120 also calculates the values for the PT3(n) and PT4(n) points from the PT1(n) and PT2(n) information.

After this, step 130 defines the point data which defines the ramp geometry for the compound curve of the rail. This data is formed as arrayed data points arranged into corresponding pairs PT1(n) and PT2(n). These points define a surface mesh which describes an imaginary surface of the finished rail at the intersection of the line 16 with each of the cross-sections 14(n). Each line 18(n) of the mesh (defined by point pairs PT1(n) and PT2(n)) is parallel to the floor and intersects the line 16 as shown in FIG. 1.

It is critical that the mesh data be defined so that the points PT1(n) and PT2(n) are positioned a sufficient distance away from the edge of the volute 10 profile. This is because the points PT1(n) and PT2(n) represent the physical location of the center of the N/C machine cutting tool. Sufficient clearance must be provided for the cutting tool to have room to manoeuver around the volute 10 as it is working.

Figure 5:
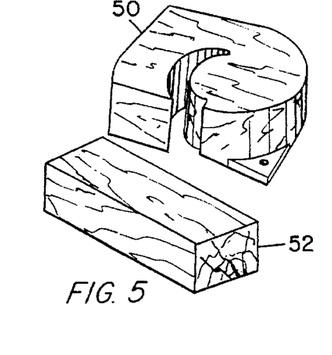
FIG. 5 is a perspective view of a first step of the second embodiment method of the present invention.
Figure 6:
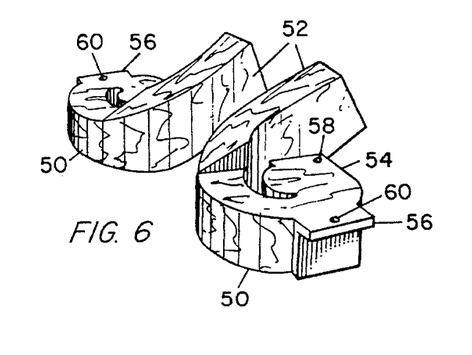
FIG. 6 is a perspective view of a second step of the second embodiment method of the present invention.
Figures 7, 9:
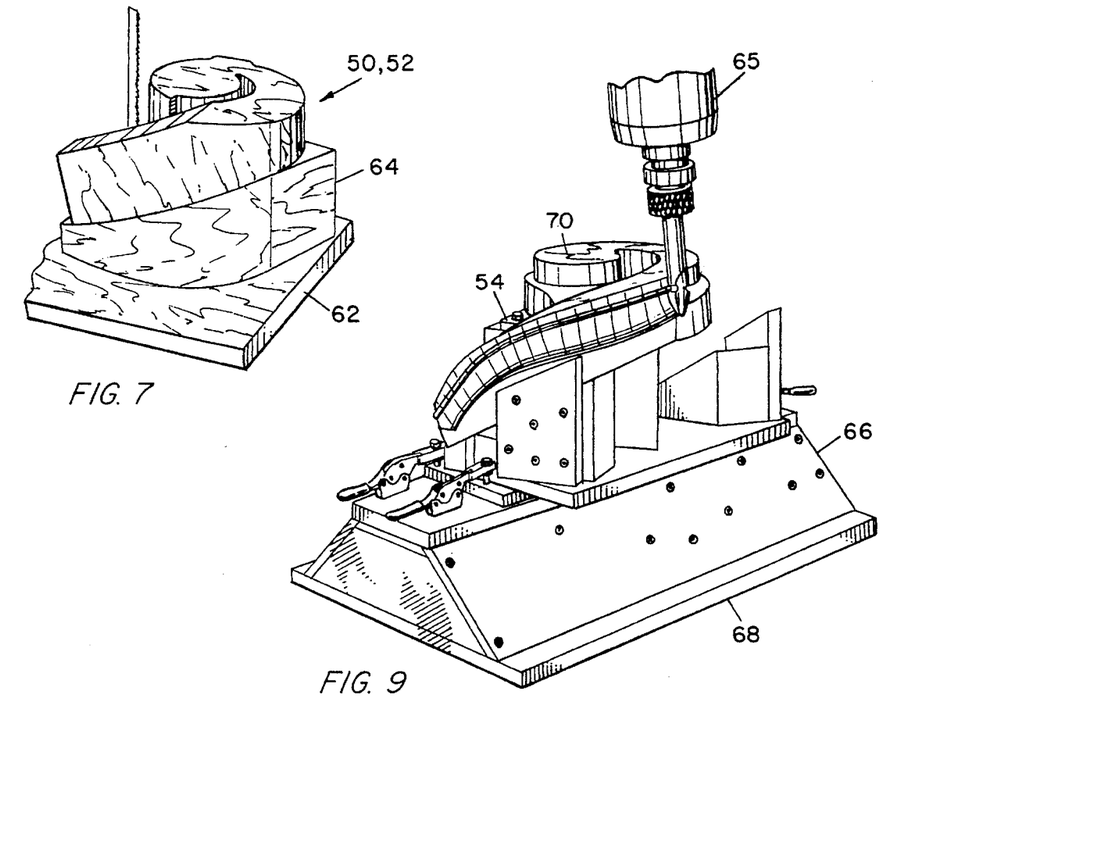
FIG. 7 is a perspective view of a third step of the second embodiment method of the present invention.
FIG. 9 is a perspective view of a fifth step of the second embodiment method of the present invention.
Figure 8:
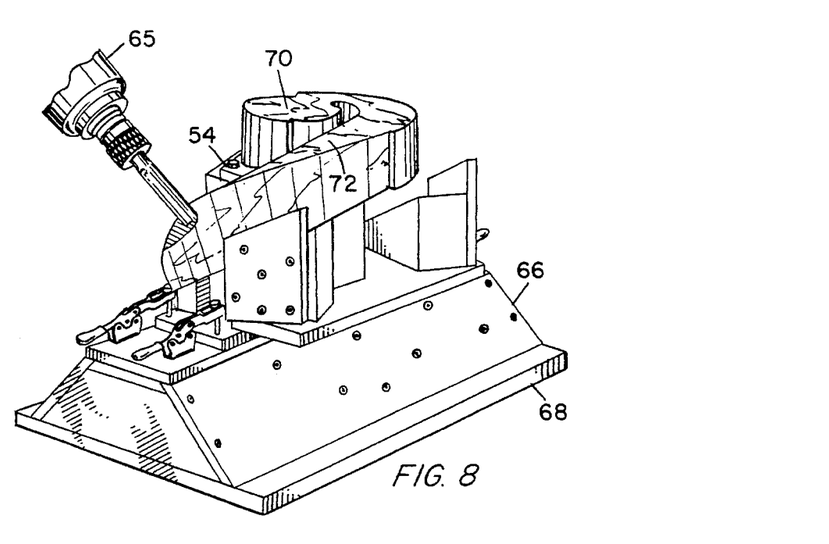
FIG. 8 is a perspective view of a fourth step of the second embodiment method of the present invention.

Referring now to FIG. 5, there is illustrated some preliminary cutting that is done to the volute rough stock prior to operation of the machine tool. A bandsaw (not shown) is used to roughly shape a block of wood 50 that will form the central spiral of the volute 10, as well as a block of wood 52 that will form the upward spiral arm of the volute 10. Each block 50 includes two extending portions 54 and 56 with mounting holes 58 and 60, respectively, drilled therethrough. These mounting holes are used to hold down the rough cut volute during the first machine tool milling sequence. The blocks 50 and 52 must also be formed in mirror image configurations, one for each handrail of the staircase. Referring now to FIG. 6, the blocks 50 and 52 for each volute 10 are glued together using standard carpentry glue to form a rough shape of the volute 10. Next, in FIG. 7, the combined rough volute 50,52 is placed on a bandsaw table 62 and further roughly finished, using a metal template fixture 64 as a guide. After this operation, the rough cut volute 10 is turned upside down and fastened to a fixture 66 using the two mounting holes 58 and 60, as illustrated in FIG. 8. The fixture 66 is in turn mounted to the longitudinal feed table 68 of the numerically controlled machine tool 65.

At this point, we return to the machine tool process of FIG. 4. The process begins preparing to cut the first side of the volute (the bottom side) at step 140, which instructs the N/C machine to get tool #2 (a 2 inch diameter end mill). Step 150 then uses this tool to cut the surfaces 70, 72 of the bottom side of the flat area and spiral arm of the volute. Next, at step 160, the N/C machine is instructed to get tool #4 (1 inch diameter, 4.5 inch cutting length end mill. Step 180 uses this tool to rough cut the sides of the volute. The illustration of FIG. 8 shows the machine tool 65 at this step in the process. Next, at step 190, the N/C machine is instructed to get tool #3 (1 inch diameter bottom profile). The bottom of the volute side profile is then cut in two passes at step 200. The illustration of FIG. 9 shows the machine tool 65 at this step of the process.

Next, at step 210, the N/C machine is instructed to get the ¾ inch diameter drill. Step 220 then drills three ¾ inch mounting holes 74, 76 and 78 (see FIG. 2) for holding the part while machining the top side. The hole 74 will also be used for the dowel on the top of the newel post during installation of the finished volute 10. The holes 76 and 78 will also be used for mounting the balusters during installation of the finished volute 10. Next, step 230 instructs the N/C machine to get the ¼ inch diameter drill. This drill is used in step 240 to drill four ¼ inch mounting holes for holding the part while machining the top side. One of the ¼ inch diameter mounting holes, hole 80 (see FIG. 1) is drilled near the top end of the spiral arm of the volute.

Figure 10:
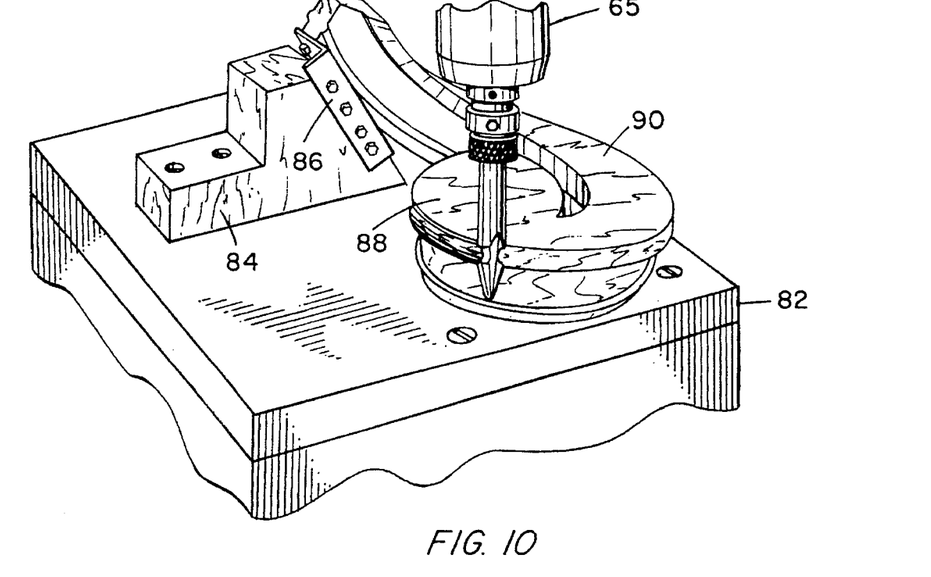
FIG. 10 is a perspective view of a sixth step of the second embodiment method of the present invention.

At step 250, the volute is turned over and mounted on the N/C machine using the mounting holes drilled for that purpose at steps 220 and 240. Mounting of the volute to the fixture 82 is shown in FIG. 10. The upward spiral arm of the volute 10 is mounted to a block 84 having a piece of angled aluminum 86 mounted thereon. The aluminum 86 extends past the end of the block 84 and includes a hole through the extending portion, through which a screw is mounted into the hole 80 on the volute 10. The block 84 provides a rigid support and mounting structure to hold the upward spiral arm of the volute 10 during machining of the top surface. Machining of the top surface begins at step 260 which instructs the N/C machine to get tool #2 (2 inch diameter end mill). Step 270 uses this tool to cut the top side 88 of the flat area of the volute 10 as well as to rough cut the top surface 90 of the spiral arm of the volute 10. Next, step 280 instructs the N/C machine to get tool #5 (top edge profiler). Step 290 then uses this tool to cut the top sides of the cross-section profile of the volute in two passes. The illustration of FIG. 10 shows the machine tool 65 at this step in the process. Step 300 then instructs the N/C machine to get tool #13 (top surface profiler). Finally, step 310 uses this tool to cut the top surface 90 down in multiple passes until the surface is worked down to its final thickness. This ends the cutting process at end block 320. A complete listing of the input program to the PC-APT™ CASE tool is reproduced as the Microfiche Appendix referenced herein.

Figure 11:
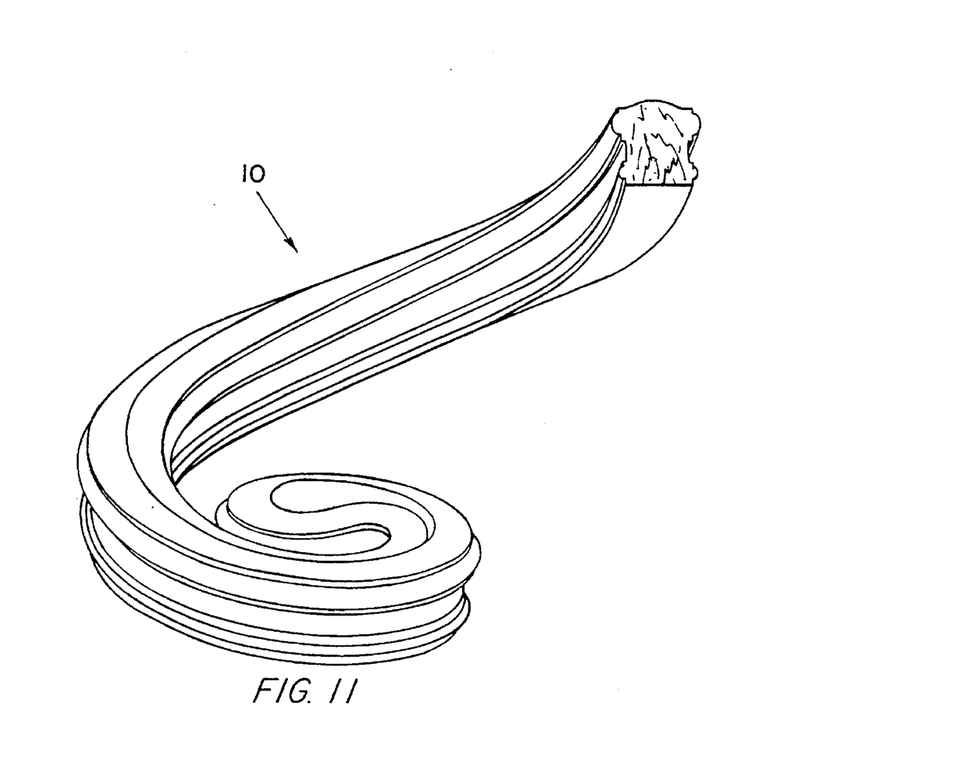
FIG. 11 is a perspective view of the first embodiment apparatus of the present invention.

Referring now to FIG. 11, the completed universal volute 10 of the present invention is illustrated in perspective. After machining of the volute 10 has been completed, there is no further woodworking required. The volute 10 is ready to be shipped after a quality control inspection. It will be appreciated by those skilled in the art that the volute 10 may be rapidly manufactured by the method of the present invention in large quantities. The use of the numerically controlled machine tool 65 allows a high degree of precision and repeatability in the woodworking as well as rapid and economical fabrication. Coupled with the fact that the compound curve of the volute 10 includes all standard legal staircase pitch angles, thereby enabling it to be used with any standard legal curving staircase, the volute of the present invention represents a monumental advance over prior art custom-made handcarved staircase handrail volutes.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. A method of manufacturing a staircase handrail volute, comprising the steps of:

(a) cutting a workpiece from wood with a bandsaw such that said workpiece has an approximation of a shape of said volute, wherein said approximation dimensions are larger than said shape dimensions;

(b) mounting said workpiece so that said workpiece may be operated on by a numerically controlled machine tool;

(c) cutting a bottom surface of said workpiece to said shape dimensions with said machine tool;

(d) cutting lower side surfaces of said workpiece with said machine tool to a first dimension between said approximation dimensions and said shape dimensions;

(e) cutting said lower side surfaces of said workpiece with said machine tool to said shape dimensions;

(f) drilling at least one mounting hole in said bottom surface with said machine tool, said at least one mounting hole for holding said workpiece in steps (g) through (j);

(g) turning said workpiece over and mounting said workpiece so that said workpiece may be operated on by a numerically controlled machine tool;

(h) cutting an upper surface of said workpiece with said machine tool to a second dimension between said approximation dimension and said shape dimension;

(i) cutting upper side surfaces of said workpiece with said machine tool to said shape dimensions; and (j) cutting said upper surface of said workpiece to said shape dimensions with said machine tool.

2. The method of claim 1, wherein said machine tool is controlled by a computer software program.

3. The method of claim 1 wherein, when said volute is oriented with respect to a floor in its installed position, a first projection of said volute into a first plane substantially parallel to said floor comprises a first curve, and a second projection of said volute into a second plane substantially perpendicular to said floor comprises a second curve, said second curve transitioning from a first pitch to a second pitch, wherein said second pitch corresponds to a maximum legal staircase pitch.

4. The method of claim 3, wherein said transitioning comprises a nonlinear rate of change from said first pitch to said second pitch.

5. The method of claim 1, wherein step (a) includes using a metal template to guide said bandsaw.

6. The method of claim 1, wherein said approximation dimensions include at least one flange area adapted for mounting said workpiece in step (b).

7. The method of claim 1, wherein said workpiece is at least two pieces of wood joined with adhesive.

8. The method of claim 1, wherein one of said at least one mounting holes is adapted to receive an end of a newel post when said volute is installed.

9. The method of claim 1, wherein one of said at least one mounting holes is adapted to receive an end of a baluster when said volute is installed.

10. A method of manufacturing a staircase handrail volute, comprising the steps of:
   (a) mounting a workpiece so that said workpiece may be operated on by a numerically controlled machine tool, said workpiece having an approximation of a shape of said volute, wherein said approximation dimensions are larger than said shape dimensions;
   (b) cutting a bottom surface of said workpiece to said shape dimensions with said machine tool;
   (c) cutting lower side surfaces of said workpiece with said machine tool to said shape dimensions;
   (d) turning said workpiece over and mounting said workpiece so that said workpiece may be operated on by said numerically controlled machine tool;
   (e) cutting upper side surfaces of said workpiece with said machine tool to said shape dimensions; and
   (f) cutting an upper surface of said workpiece to said shape dimensions with said machine tool.

11. The method of claim 10, further including the step of:
   (g) drilling at least one mounting hole in said bottom surface with said machine tool, said at least one mounting hole for holding said workpiece in steps (e) and (f).

12. The method of claim 10, wherein said machine tool is controlled by a computer software program.

13. The method of claim 10 wherein, when said volute is oriented with respect to a floor in its installed position, a first projection of said volute into a first plane substantially parallel to said floor comprises a first curve, and a second projection of said volute into a second plane substantially perpendicular to said floor comprises a second curve, said second curve transitioning from a first pitch to a second pitch, wherein said second pitch corresponds to a maximum legal staircase pitch.

14. The method of claim 13, wherein said transitioning comprises a nonlinear rate of change from said first pitch to said second pitch.

15. The method of claim 10, wherein said approximation dimensions include at least one flange area adapted for mounting said workpiece in step (a).

16. The method of claim 10, wherein said workpiece is at least two pieces of wood joined with adhesive.

17. The method of claim 11, wherein one of said at least one mounting holes is adapted to receive an end of a newel post when said volute is installed.

18. The method of claim 11, wherein one of said at least one mounting holes is adapted to receive an end of a baluster when said volute is installed.

* * * * *